United States Patent
Chen (10) Patent No.: US 9,307,124 B2
(45) Date of Patent: Apr. 5, 2016

(54) WALL STAND

(71) Applicant: Sercomm Corporation, Tapei (TW)

(72) Inventor: Chia-An Chen, New Taipei (TW)

(73) Assignee: SERCOMM CORPORATION, Tapei (TW)

(*) Notice: Subject to any disclaimer, the term of this patent is extended or adjusted under 35 U.S.C. 154(b) by 211 days.

(21) Appl. No.: 13/955,047

(22) Filed: Jul. 31, 2013

(65) Prior Publication Data

US 2015/0001358 A1    Jan. 1, 2015

(30) Foreign Application Priority Data

Jun. 26, 2013  (CN) .......................... 2013 1 0259943

(51) Int. Cl.
*H04N 5/225*  (2006.01)
*F16M 13/02*  (2006.01)

(52) U.S. Cl.
CPC ............. *H04N 5/2251* (2013.01); *F16M 13/02* (2013.01); *F16M 13/022* (2013.01); *Y10T 29/49824* (2015.01); *Y10T 29/49826* (2015.01); *Y10T 29/49963* (2015.01)

(58) Field of Classification Search
CPC ..... F16M 13/00; F16M 13/02; F16M 13/022; A47K 10/10; A47G 25/0628; A47G 25/0635
USPC ............... 248/220.21, 222.13, 224.8, 221.11, 248/223.31, 222.51; 211/1, 123
See application file for complete search history.

(56) References Cited

U.S. PATENT DOCUMENTS 2,587,912 A * 3/1952 Simpson .................. A47K 1/08
                                                        248/221.11
8,317,148 B2 * 11/2012 Ernst .................. A47G 25/0607
                                                        248/223.41

(Continued)

FOREIGN PATENT DOCUMENTS

CN          101226780 A       7/2008

OTHER PUBLICATIONS

English Abstract translation of CN101226780 (Published Jul. 23, 2008).

(Continued)

*Primary Examiner* — Anita M King
(74) *Attorney, Agent, or Firm* — McClure, Qualey & Rodack, LLP (57) ABSTRACT

A wall stand is provided. The wall stand comprises a stand body and a bottom plate. The stand body includes a base, a pressing component and a pressing component. The base has an opening. The pressing component comprises a pressing portion disposed corresponding to the opening. The pressing component is disposed on the base. The bottom plate is configured for being mounted on a wall. The bottom plate includes an elastic component and at least one supporting portion. The elastic component is disposed corresponding to the pressing component for being engaged with the pressing component and disengaged from the pressing component by a force from the pressing component. The at least one supporting portion is configured for correspondingly supporting the at least one fixing component. A method for using the wall stand for an IP camera is also provided.

16 Claims, 6 Drawing Sheets

(56) References Cited

U.S. PATENT DOCUMENTS

| | | | | |
|---|---|---|---|---|
| 8,430,369 B2* | 4/2013 | Hsu | ................... | A47K 10/04 211/105.1 |
| 2007/0272819 A1* | 11/2007 | Wang | ................... | A47G 1/202 248/476 |
| 2009/0108157 A1* | 4/2009 | Spencer | ................... | A47G 25/0635 248/222.13 |
| 2010/0219308 A1* | 9/2010 | Ernst | ................... | F16B 45/00 248/217.4 |
| 2012/0067837 A1* | 3/2012 | He | ................... | A47K 10/10 211/123 |
| 2012/0145854 A1* | 6/2012 | Smith | ................... | A47K 10/10 248/226.11 |
| 2014/0026402 A1* | 1/2014 | Austin, III | ................... | F16M 13/02 29/700 |

OTHER PUBLICATIONS

CN Office Action dated Oct. 8, 2014.

* cited by examiner

FIG. 3C

WALL STAND

This application claims the benefit of People's Republic of China application Serial No. 201310259943.1, filed on Jun. 26, 2013, the disclosure of which is incorporated by reference herein in its entirety.

BACKGROUND

1. Technical Field

Embodiments of the present invention generally relate to a stand and a method for using the same. More particularly, this invention relates to a wall stand, which can be assembled, mounted, dismantled or removed easily, and a method for using the same.

2. Description of the Related Art

IP cameras have been widely used. For example, one application is home security. An IP camera may be placed on a table or a ledge, or fixed to a wall or even the ceiling, depending on the requirement and convenience of the user.

In the cases that a wall stand is used for mounting an IP camera, typically, screws are fastened into the wall at first, and then the stand is hung up. In such a mounting process, rather than positioning the screws directly by the bottom plate of the stand, an extra positioning tool, such as a positioning card, is needed. Further, repeatedly tests may be needed to check how deep the screws should be inserted into the wall. Otherwise, the screw portions left outside the wall may be too short to support the stand or too long to secure the bottom plate. However, when the user hangs the stand up on the screws, the screws are generally blocked by the stand body and cannot be seen, as such, it is more difficult and time-consuming to complete the mounting process.

In addition, much time is needed to assemble and dismantle the stand of previous design, in which the body and the bottom plate of the stand are generally fastened together by a screw. Further, this screw is hidden in the stand and must be driven by a special screwdriver. As such, it is inconvenient to assemble and dismantle such a stand.

SUMMARY

A wall stand, which can be assembled, mounted, dismantled or removed easily, and a method for using the same are provided herein.

In one aspect, a wall stand is provided.

According to some embodiments, the wall stand comprises a stand body and a bottom plate. The stand body includes a base, a pressing component and at least one fixing component. The base has an opening. The pressing component comprises a pressing portion disposed corresponding to the opening. The at least one fixing component is disposed on the base. The bottom plate is configured for being mounted on a wall. The bottom plate includes an elastic component and at least one supporting portion. The elastic component is disposed corresponding to the pressing component for being engaged with the pressing component and disengaged from the pressing component by a force from the pressing component. The at least one supporting portion is configured for correspondingly supporting the at least one fixing component.

According to some other embodiments, the wall stand comprises a stand body, a bottom plate, means for connecting the stand body with the bottom plate, means for assisting dismantling of the wall stand, and means for mounting the wall stand on a wall. The stand body has a base. The bottom plate is configured for being coupled to the base. The means for assisting dismantling of the wall stand comprises a first portion disposed on the stand body and a second portion disposed on the bottom plate and corresponding to the first portion.

In another aspect, a method for using a wall stand of an IP camera is provided. The wall stand is mounted when mounting the IP camera. At first, a bottom plate of the wall stand is mounted onto a wall. After mounting the bottom plate onto the wall, a stand body of the wall stand is aligned with the bottom plate, and moved down such that at least one fixing component of the stand body is correspondingly supported by at least one supporting portion of the bottom plate and a pressing component of the stand body is engaged with an elastic component of the bottom plate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. Further, some elements and reference numerals may be removed from some of the drawings for clarity. It is contemplated that elements and features of one embodiment may be beneficially incorporated in other embodiments without further recitation.

DETAILED DESCRIPTION

Various embodiments of the wall stand, which can be assembled, mounted, dismantled or removed easily, and the method for using the same are described below in detail.

Figure 1A:
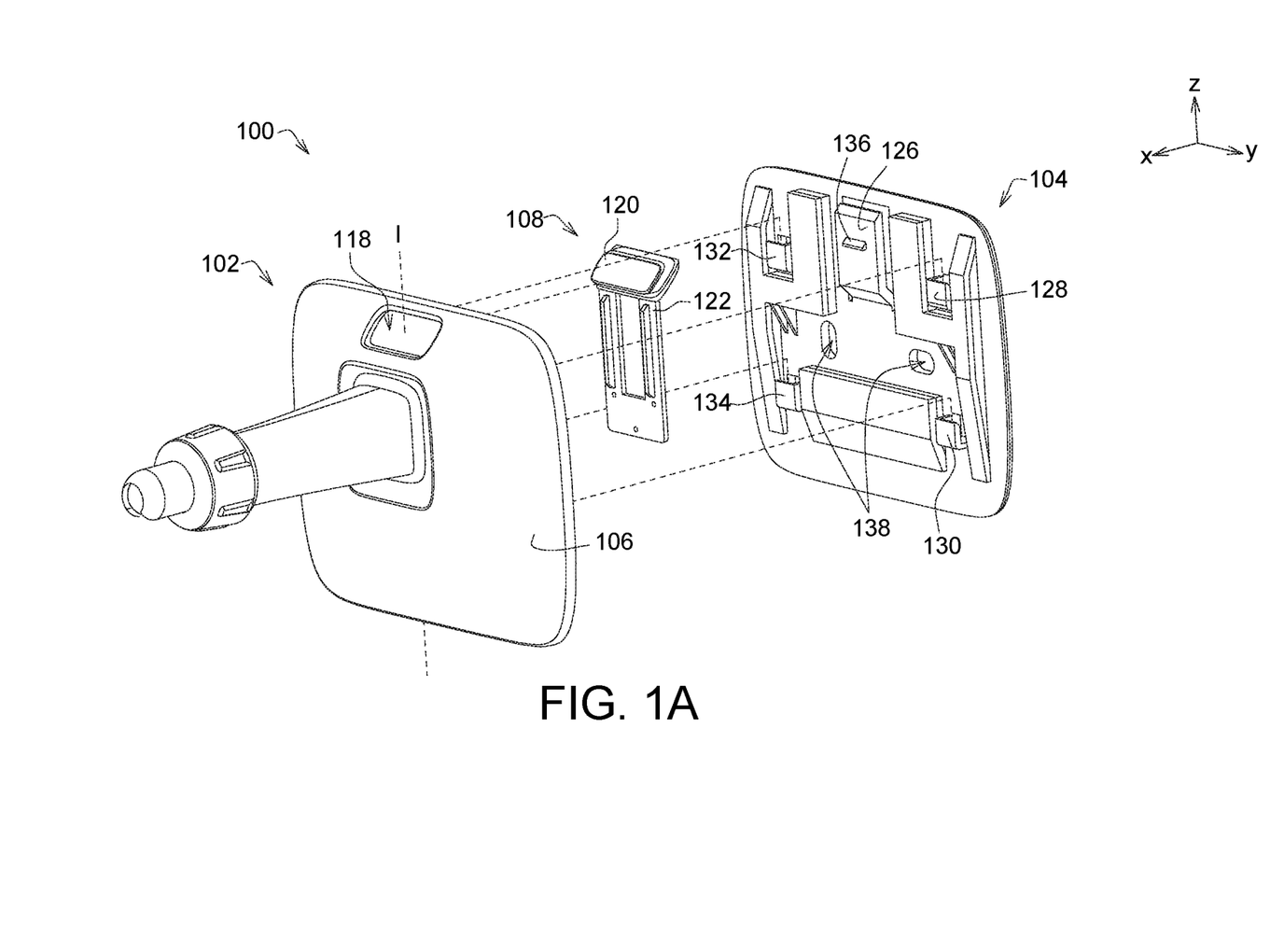
FIGS. 1A-1B are schematic exploded views of a wall stand according to one embodiment.
Figure 1B:
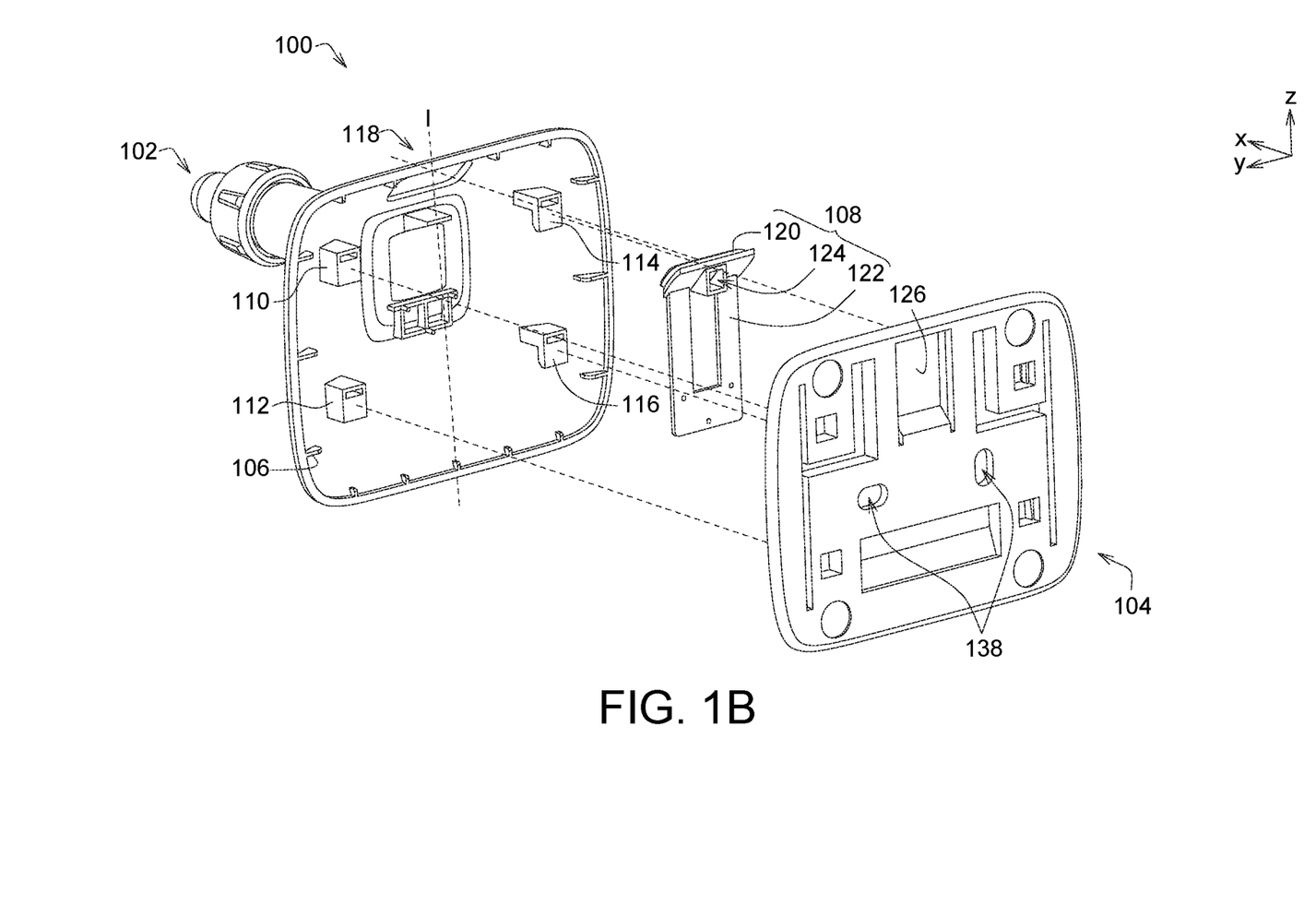

FIGS. 1A and 1B are schematic exploded views of a wall stand 100 according to one embodiment. The wall stand 100 is suitable for mounting of an IP camera on a wall. It is to be noted, however, that the term "wall" used herein should further embrace a ceiling and any sides that a wall stand may be adapted to, etc., and not be limited to a wall of a room or a building. The wall stand 100 comprises a stand body 102 and a bottom plate 104.

The stand body 102 comprises a base 106, a pressing component 108 and at least one fixing component disposed on the base 106. Here, four fixing components 110, 112, 114 and 116 are exemplary used, as shown in FIG. 1B. However, the number of fixing components that allows for fixing of the stand body on the bottom plate is not limited to 4. The base 106 has an opening 118. The pressing component 108 comprises a pressing portion 120 disposed corresponding to the opening 118. The pressing component 108 may further comprises a force applying portion 122, wherein one end of the force applying portion 122 is coupled to the pressing portion 120, this end is movable toward the bottom plate 104, and the other end of the force applying portion 122 is fixed. In some embodiments, said other end of the force applying portion 122 is connected to the base 106 by, for example, welding.

Further, in some embodiments, the pressing component 108 may further comprise a receiving portion 124.

The bottom plate 104 is configured for being mounted on a wall (not shown). The bottom plate 104 corresponds to the base 106 of the stand body 102, such that the bottom plate 104 can be coupled to the base 106 when the wall stand 100 is assembled. The bottom plate 104 comprises an elastic component 126 and at least one supporting portion. Here, corresponding to the four fixing components 110, 112, 114 and 116, four supporting portions 128, 130, 132 and 134 are exemplary used, as shown in FIG. 1A. The number of the supporting portion is not limited to 4 and can be more or less, depending on the number of the corresponding fixing component. In the condition that the bottom plate 104 and the base 106 have been coupled to each other, a space R (shown in FIG. 2D) is defined by the base 106 and the bottom plate 104, and a portion of the pressing component 108, the at least one fixing component (110~116), the elastic component 126 and the at least one supporting portion (128~134) are disposed in the space R. Here, the portion of the pressing component 108 that located in the space R is the portion excluding the pressing portion 120, such as the force applying portion 122 and the receiving portion 124.

The elastic component 126 is disposed corresponding to the pressing component 108 of the stand body 102 for being engaged with the pressing component 108 when the wall stand 100 is assembled, and for being disengaged from the pressing component 108 by a force from the pressing component 108 in the condition that the wall stand 100 is assembled. In some embodiments, the elastic component 126 may have a protrusion 136 corresponding to the receiving portion 124 of the pressing component 108 for being engaged in the receiving portion 124.

More specifically, in one embodiment, the elastic component 126 is substantially disposed corresponding to the force applying portion 122 of the pressing component 108. In the condition that the wall stand 100 is assembled, the protrusion 136 of the elastic component 126 is engaged in the receiving portion 124 of the pressing component 108, and the stand body 102 and the bottom plate 104 firmly connect with each other. In such a condition, a force applied to the pressing portion 120, which is disposed in the opening 118, will be transmitted to the force applying portion 122 coupled with the pressing portion 120. At this time, the end of the force applying portion 122 connected to the base 106 is fixed, while the end coupled to the pressing portion 120 moves toward the bottom plate 104 and presses the elastic component 126, disengages the protrusion 136 from the receiving portion 124, and thus disengages the pressing component 108 from the elastic component 126, and further disengages the stand body 102 from the bottom plate 104.

In other words, in the example shown in FIGS. 1A and 1B, the pressing component 108 of the stand body 102 and the corresponding elastic component 126 of bottom plate 104 compose means for assisting dismantling of the wall stand 100. However, the means for assisting dismantling of the wall stand 100 may be constituted by other structures and are not limited to the pressing component 108 and the corresponding elastic component 126 as described above. In one example, a first portion of the means for assisting dismantling of the wall stand is disposed on the stand body, being formed as an opening of the base, and a second portion of the means for assisting dismantling of the wall stand is disposed on the bottom plate and corresponds to the first portion, being formed as a U-shape slide. In such an example, when the stand body and the bottom plate must be securely engaged with each other, the U-shape slide may be slid to a place such that an edge of the opening is firmly locked by the U-shape slide, while separation of the stand body from the bottom plate is desired, the U-shape slide may be slid away from the edge. In another example, the first and the second portions of the dismantling assisting means may be formed as a deadbolt. Any structure that allows for secure engagement and simple disengagement between the stand body and the bottom plate when the stand body is connected with and to be separated from the bottom plate, respectively, may be used as the dismantling assisting means.

The at least one supporting portion of the bottom plate 104 is configured for correspondingly supporting the at least one fixing component of the stand body 102. In other words, the at least one fixing component, which is disposed on the base 106, of the stand body 102 and the at least one supporting portion of the bottom plate 104 constitute means for connecting the stand body with the bottom plate. In the example shown in FIGS. 1A and 1B, the at least one fixing component comprises four fixing components 110, 112, 114 and 116 positioned near the four corners of the base 106, respectively, and the at least one supporting portion comprises four supporting portions 128, 130, 132 and 134. Here, in the condition that the wall stand 100 is assembled, the supporting portions 128, 130, 132, 134 correspondingly support the fixing components 110, 112, 114, 116, respectively, and the supporting portions together with the fixing components compose the connecting means of the wall stand 100. In the example shown in FIGS. 1A and 1B, each of the fixing components 110, 112, 114, 116 and the supporting portions 128, 130, 132, 134 is formed as a structure that three connecting orthogonal sides forms a corner. The three orthogonal sides of respective fixing components 110, 112, 114 and 116 are opposite to the three orthogonal sides of respective supporting portions 128, 130, 132 and 134. As such, the corners of the fixing components 110, 112, 114 and 116 may be respectively engaged with the corners of the supporting portions 128, 130, 132 and 134, and thereby each of the supporting portions can support the corresponding fixing component. However, any structure that allows for correspondingly connecting and engaging the stand body with the bottom plate may be used as the means for connecting the stand body with the bottom plate, and the connecting means is not limited to the structure described above. Furthermore, in some embodiments, the at least one fixing component is symmetrically disposed with respect to a centerline of the base, such that a better engagement between the stand body and the bottom plate can be achieved. For example, as illustrated in the drawings, the four fixing components 110, 112, 114 and 116 are symmetrically disposed with respect to a centerline I of the base 106. In addition, in the illustrated example, the opening 118 and the pressing component 108 are disposed on the centerline I of the base 106 and positioned on the upper portion of the base 106. However, the positions of the opening 118 and the pressing component 108 are not limited. For example, the opening 118 and the pressing component 108 may be positioned on the lower portion of the base 106. Further, the positions of the first and the second portions of the dismantling assisting means may be decided depending on their type and user's convenience.

In some embodiments, the wall stand 100 further comprises means for mounting the wall stand 100 on a wall, such as at least one hole 138 of the bottom plate 104 and at least one fastener. The at least one fastener passes through the at least one hole 138 and is used to mount the bottom plate 104 on the wall. In some embodiments, the fastener may be a screw (such as screws 140 shown in FIG. 2A). In the cases that at least one screw 140 through the at least one hole 138 of the bottom plate 104 is used to mount the bottom plate 104 on the wall, the bottom plate 104 may comprises two holes 138 that slightly extends in two orthogonal directions, as shown in FIG. 1B. Such a design allows for a tolerance of the position of the screws 140, and is useful in the positioning of the bottom plate 104. Although at least one hole (holes 138) and at least one fastener (screws 140) are exemplarily illustrated, the mounting means are not limited thereto. For example, semi-permanent adhesive, damage-free adhesive stripes, etc., may be used to mount the wall stand 100 on a wall. In such a case, the bottom plate 104 may not comprise a hole 138.

Now the description is directed to a method for using a wall stand of an IP camera according to one embodiment.

FIGS. 2A-2E are schematic illustrations of a wall stand 100 at various stages of mounting according to one embodiment. These stages may illustrate the various steps of the mounting of the wall stand 100 when an IP camera is mounted.

Figure 2A:
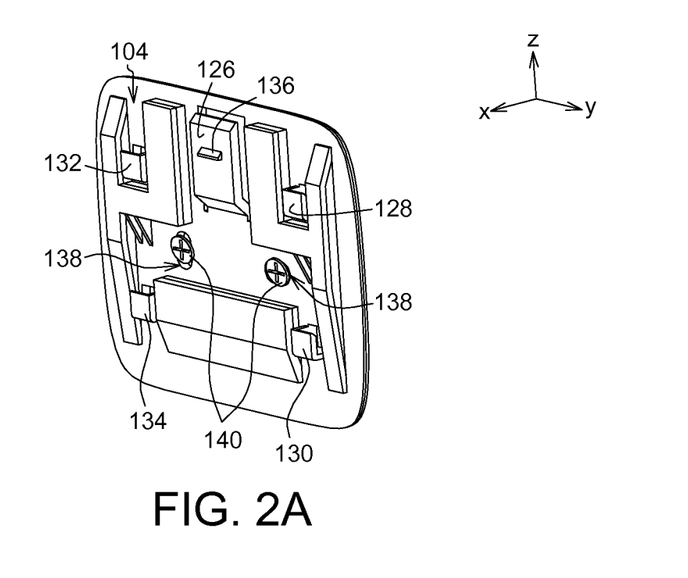
FIGS. 2A-2E are schematic illustrations of a wall stand at various stages of mounting according to one embodiment.

Referred to FIG. 2A, a bottom plate 104 of the wall stand 100 is mounted onto a wall (not shown). The step of mounting the bottom plate 104 onto the wall may comprise, for example, contacting the bottom plate 104 to the wall, and passing at least one screw 140 correspondingly through at least one hole 138 of the bottom plate 104 to mount the bottom plate 104 onto the wall. Here, the same bottom plate 104 as shown in FIGS. 1A and 1B is exemplarily shown, however, the bottom plate 104 is not limited thereto. A bottom plate 104 according to any one of the embodiments or examples described above may be used.

Figure 2B:
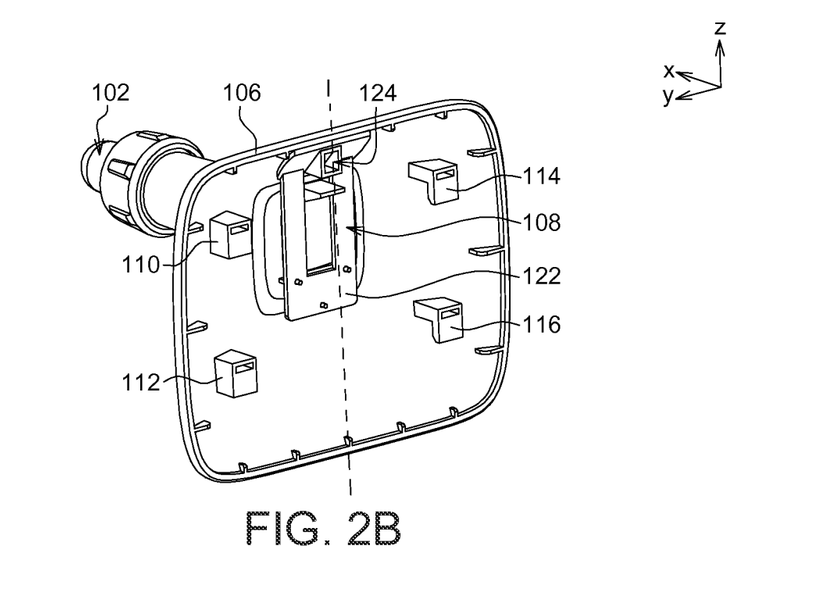

Referred to FIG. 2B, a stand body 102 of the wall stand 100 is provided. Although the same stand body 102 as shown in FIGS. 1A and 1B is shown, the stand body 102 is not limited thereto. The stand body 102 may be according to any one of the embodiments or examples described above.

Figure 2C:
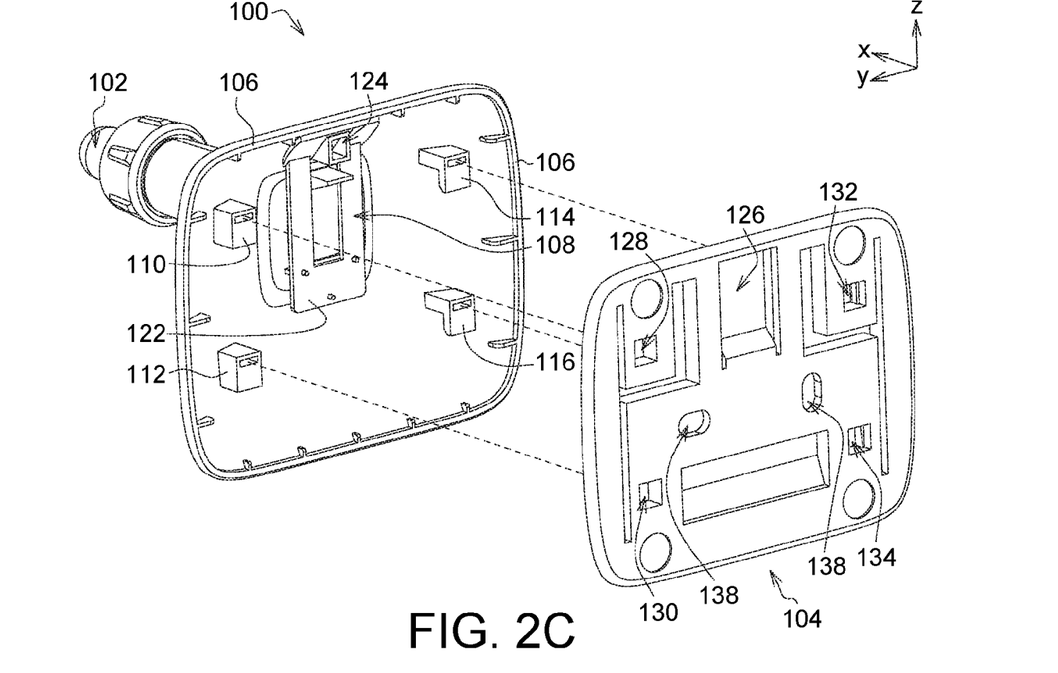

Referred to FIG. 2C, after mounting the bottom plate 104 onto the wall, aligning the stand body 102 of the wall stand 100 with the bottom plate 104.

Figure 2D:
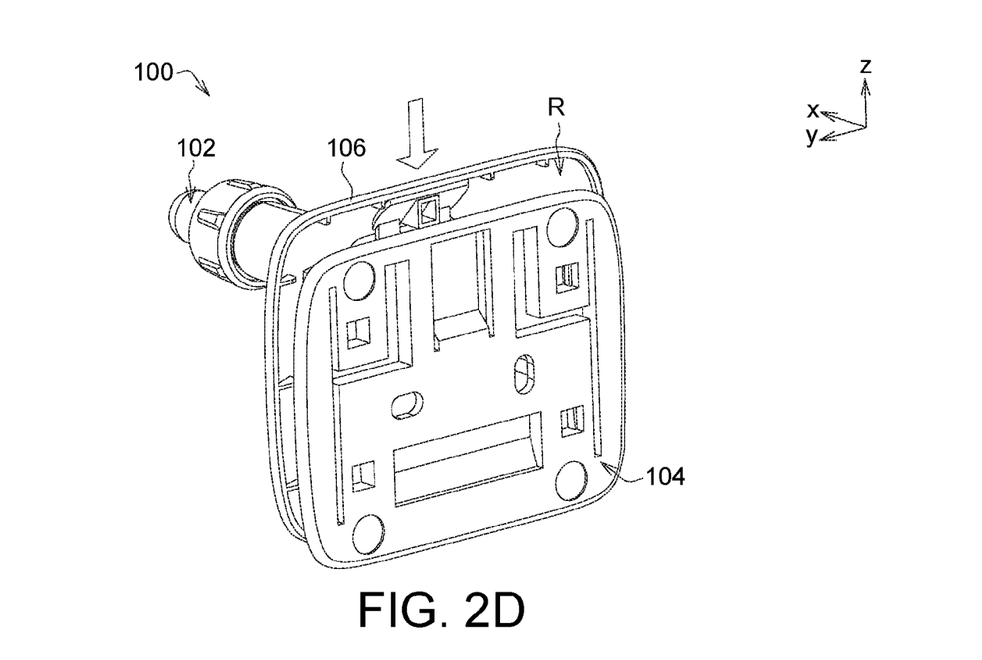

Referred to FIG. 2D, the stand body 102 is moved down, as indicated by the arrow, from a position slightly higher than the bottom plate 104, such that at least one fixing component (such as fixing components 110~116 shown in FIG. 2C) of the base 106 of the stand body 102 is correspondingly supported in at least one supporting portion (such as supporting portions 128~134 shown in FIG. 2C) of the bottom plate 104, and the pressing component 108 (shown in FIG. 2C) of the base 106 is engaged with the elastic component 126 (shown in FIG. 2C) of the bottom plate 104.

Figure 2E:
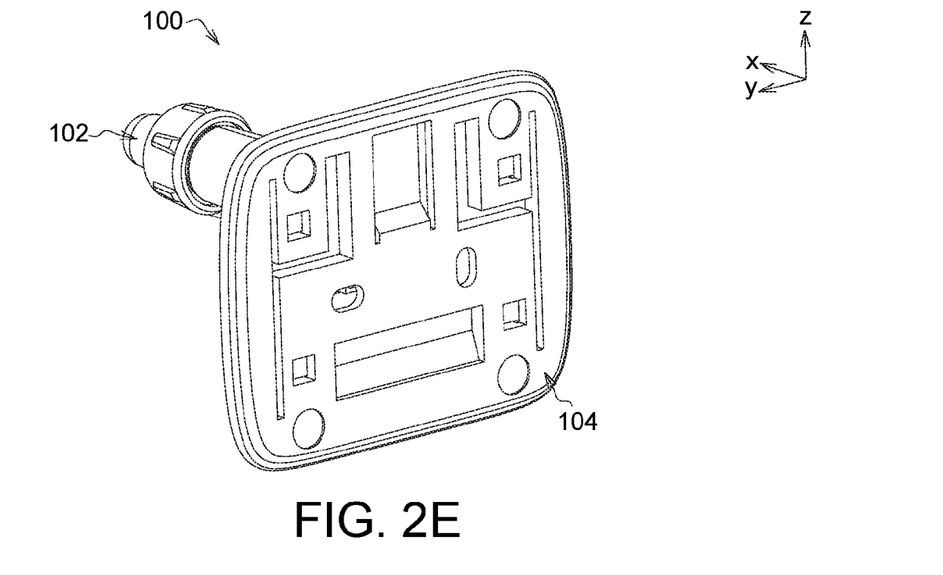

As such, as shown in FIG. 2E, the stand body 102 has been engaged with the bottom plate 104, and the assembly of the wall stand 100 has been completed. A step of fixing a camera body (not shown) of the IP camera to the stand body 102 may be conducted at following. Alternatively, before the stand body 102 is engaged with the bottom plate 104, a camera body has been fixed on the stand body 102.

Figure 3A:
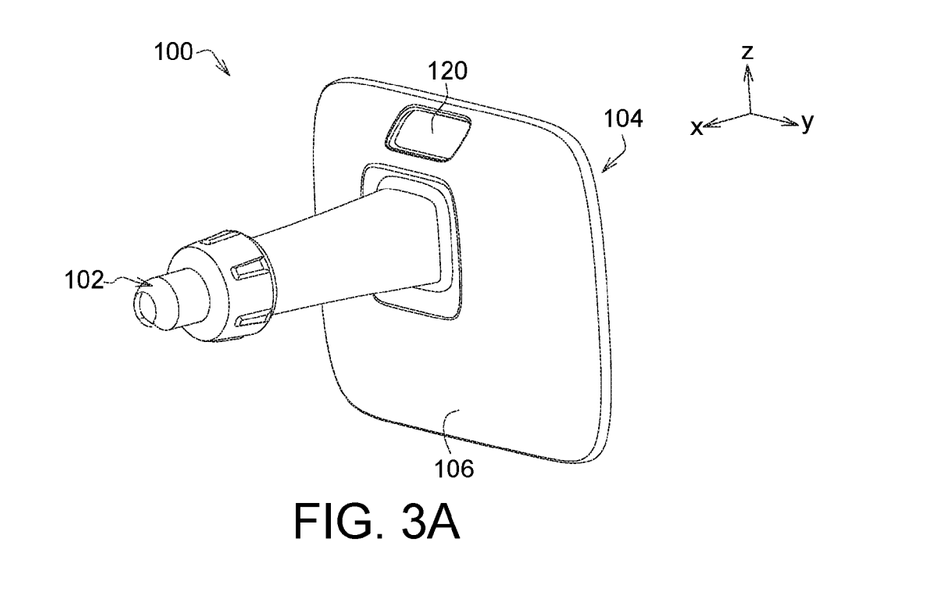
FIGS. 3A-3C are schematic illustrations of a wall stand at various stages of removal according to one embodiment.
Figure 3B:
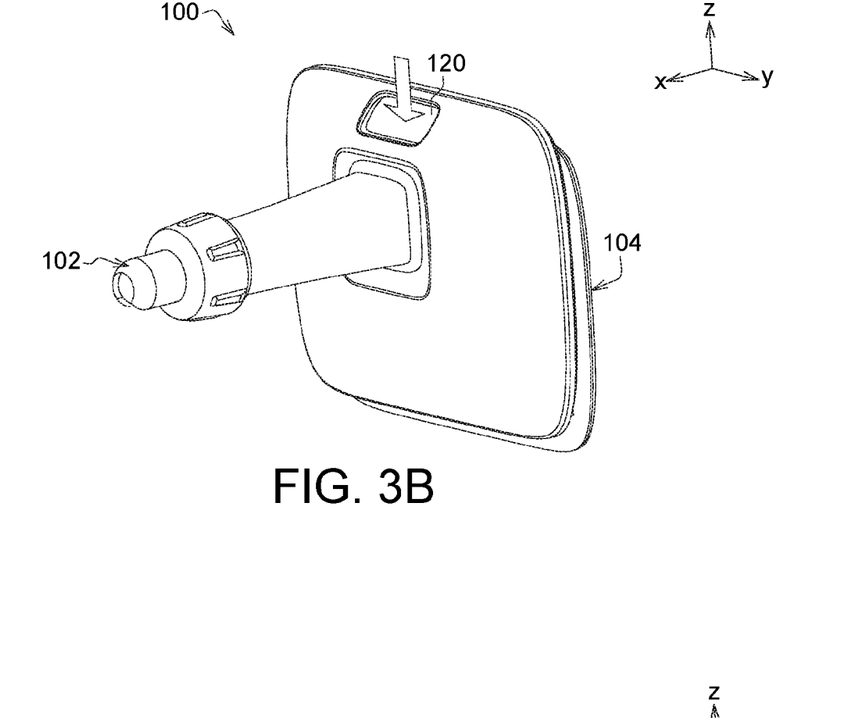
Figure 3C:
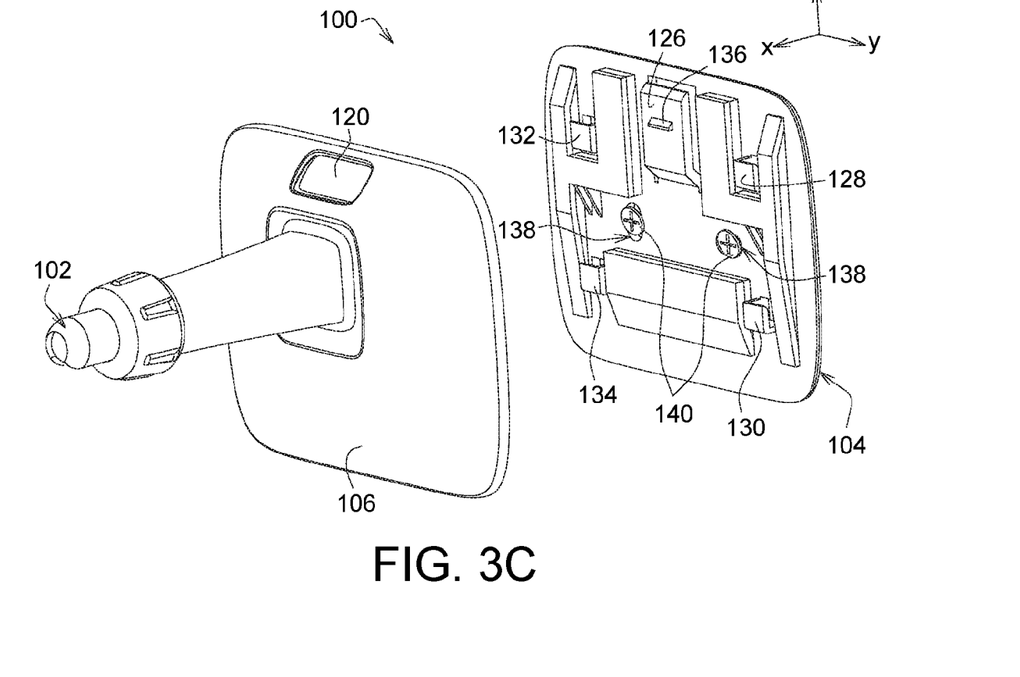

FIGS. 3A-3C are schematic illustrations of a wall stand 100 at various stages of removal according to one embodiment. These stages may illustrate the various steps of the removal of the wall stand 100 when an IP camera is removed or exchanged.

As shown in FIG. 3A, the wall stand 100 is mounted on a wall (not shown). Here, the same wall stand 100 as shown in FIGS. 1A and 1B is shown, however, the wall stand may have different structures as described above.

When removing the wall stand 100 is desired, referred to FIG. 3B, one may press a pressing portion 120 of the pressing component 108 (shown in FIGS. 1A and 1B) of the stand body 102, such that a force may applied to the elastic component 126 (shown in FIGS. 1A and 1B) from the pressing component 108 and the pressing component 108 can be disengaged from the elastic component 126. More specifically, in some embodiments, by pressing the pressing portion 120, the end of the force applying portion 122 (shown in FIGS. 1A and 1B) coupled to the pressing portion 120 moves toward the bottom plate 104 and presses the elastic component 126, thereby disengaging the protrusion 136 (shown in FIGS. 1A and 1B) form the receiving portion 124 (shown in FIGS. 1A and 1B), and thus disengaging the pressing component 108 from the elastic component 126. Referred to FIG. 3B, in the condition that the stand body 102 is disengaged from the bottom plate 104, one may move the stand body 102 up and separate the stand body 102 from the bottom plate 104.

As such, as shown in FIG. 3C, the stand body 102 has been separated from the bottom plate 104. In some embodiments, after separating the stand body 102 from the bottom plate 104, the bottom plate 104 may be removed from the wall. The removal of the bottom plate 104 may be conducted by, for example, removing the screws 140 and releasing the bottom plate 104 from the wall. However, in the cases that an exchange of the IP camera is desired and the same bottom plate 104 can be used for the new IP camera, the bottom plate 104 may remain on the wall, only the camera body and the corresponding stand body 102 are changed.

As illustrated in the embodiments described above, the way of connecting the bottom plate and the stand body of a wall stand has been modified. No screw is used to connect the bottom plate and the stand body in the wall stands according to the embodiments described herein, therefore, simple engagement and disengagement between the bottom plate and the stand body can be achieved.

In addition, when mounting the wall stand according to the embodiments described herein, the screws used for mounting the stand on the wall are positioned directly by means of the bottom plate of the stand, and the screws are not blocked by the stand body. Further, the repeatedly tests are not needed when mounting the wall stand according to the embodiments described herein.

As such, the use of the wall stand according to the embodiments described herein may simplify the mounting and removing processes, thereby decrease the spent time and the cost. Therefore, the product value of the wall stand is improved according to the present invention.

While the foregoing is directed to embodiments of the present invention, other and further embodiments of the invention may be devised without departing from the basic scope thereof, and the scope thereof is determined by the claims that follow.

What is claimed is:

1. A wall stand, comprising:
   a stand body including:
   a base having an opening;
   a pressing component comprising a pressing portion disposed corresponding to the opening; and
   at least one fixing component disposed on the base; and
   a bottom plate configured for being mounted on a wall, the bottom plate including:
   an elastic component disposed corresponding to the pressing component for being engaged with the pressing component and disengaged from the pressing component by a force from the pressing component; and
   at least one supporting portion configured for correspondingly supporting the at least one fixing component.

2. The wall stand of claim 1, wherein a part of the pressing component, the at least one fixing component, the elastic component, and the at least one supporting portion are disposed in a space defined by the base and the bottom plate.

3. The wall stand of claim 1, wherein the pressing component further comprises a force applying portion, an end of the force applying portion coupled to the pressing portion is movable toward the bottom plate, and the other end of the force applying portion is fixed.

4. The wall stand of claim 1, wherein the pressing component further comprises a receiving portion, and the elastic component has a protrusion corresponding to the receiving portion for being engaged in the receiving portion.

5. The wall stand of claim 1, wherein the opening and the pressing component are positioned on a centerline of the base.

6. The wall stand of claim 1, wherein the at least one fixing component is symmetrically disposed with respect to a centerline of the base.

7. The wall stand of claim 6, wherein the at least one fixing component comprises four fixing components positioned near four corners of the base, respectively, and the at least one supporting portion comprises four supporting portions.

8. The wall stand of claim 1, wherein the bottom plate further comprises at least one hole to permit at least one fastener used to mount the bottom plate on the wall to pass therethrough.

9. A wall stand, comprising:
   a stand body having a base;
   a bottom plate configured for being coupled to the base;
   means for connecting the stand body with the bottom plate;
   means for assisting dismantling of the wall stand, comprising:
   a first portion disposed on the stand body, and
   a second portion disposed on the bottom plate and corresponding to the first portion; and
   means for mounting the wall stand on a wall;
   wherein the first portion is a pressing component comprising a pressing portion disposed in an opening of the base, and the second portion is an elastic component disposed corresponding to the pressing component.

10. The wall stand of claim 9, wherein the means for connecting the stand body with the bottom plate comprises:
    at least one fixing component of the stand body; and
    at least one supporting portion of the bottom plate for correspondingly supporting the at least one fixing component.

11. The wall stand of claim 10, wherein the at least one fixing component comprises four fixing components positioned near four corners of the base, respectively, and the at least one supporting portion comprises four supporting portions.

12. The wall stand of claim 9, wherein the pressing component further comprises a force applying portion, an end of the force applying portion coupled to the pressing portion is movable toward the bottom plate, and the other end of the force applying portion is fixed, such that a force can be applied to the elastic component from the force applying portion and disengage the pressing component from the elastic component.

13. The wall stand of claim 9, wherein the pressing component further comprises a receiving portion, and the elastic component has a protrusion corresponding to the receiving portion for being engaged in the receiving portion.

14. The wall stand of claim 9, wherein the means for connecting the stand body with the bottom plate and the means for assisting dismantling of the wall stand are disposed symmetrically with respect to a centerline of the base.

15. The wall stand of claim 9, wherein means for mounting the wall stand on the wall comprises:
    at least one hole; and
    at least one fastener corresponding to the at least one hole.

16. The wall stand of claim 15, wherein the at least one fastener is a screw.

* * * * *

UNITED STATES PATENT AND TRADEMARK OFFICE
CERTIFICATE OF CORRECTION

PATENT NO. : 9,307,124 B2  
APPLICATION NO. : 13/955047  
DATED : April 5, 2016  
INVENTOR(S) : Chen Page 1 of 1

It is certified that error appears in the above-identified patent and that said Letters Patent is hereby corrected as shown below:

On the title page item (73), Assignee city, please delete "Tapei" and insert --Taipei--

Signed and Sealed this
Twenty-sixth Day of July, 2016

Michelle K. Lee
*Director of the United States Patent and Trademark Office*